US008812891B2

(12) United States Patent
Arimoto et al.

(10) Patent No.: US 8,812,891 B2
(45) Date of Patent: Aug. 19, 2014

(54) IMAGE FORMING APPARATUS WITH MOTOR DRIVERS CAPABLE OF DIRECTLY COMMUNICATING POWER ABNORMALITIES TO OTHER DRIVERS

(75) Inventors: Hideki Arimoto, Nagoya (JP);
Hidenobu Kondo, Nagoya (JP); Kyoichi Morita, Aichi-ken (JP); Takahiko Watari, Nagoya (JP); Takahiro Ikeno, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 253 days.

(21) Appl. No.: 13/247,904

(22) Filed: Sep. 28, 2011

(65) Prior Publication Data

US 2012/0159228 A1    Jun. 21, 2012

(30) Foreign Application Priority Data

Dec. 21, 2010  (JP) .................................. 2010-284305

(51) Int. Cl.
*G06F 1/26* (2006.01)
*G06F 1/32* (2006.01)
*G06F 3/12* (2006.01)

(52) U.S. Cl.
CPC ............... *G06F 1/26* (2013.01); *G06F 1/3284* (2013.01); *G06F 3/1229* (2013.01)
USPC .......................................................... 713/340

(58) Field of Classification Search
CPC ....... G06F 1/26; G06F 1/3284; G06F 3/1229; G06F 3/1276; G06F 3/1281
USPC .......................................................... 713/340
See application file for complete search history.

(56) References Cited

U.S. PATENT DOCUMENTS

| 6,384,561 | B1 * | 5/2002 | Niizuma et al. | 318/625 |
|---|---|---|---|---|
| 2004/0205367 | A1 * | 10/2004 | Keithley et al. | 713/400 |
| 2004/0227970 | A1 * | 11/2004 | Ohara | 358/1.13 |
| 2005/0024000 | A1 * | 2/2005 | Aizawa | 318/34 |
| 2005/0269980 | A1 * | 12/2005 | Hongo | 318/66 |
| 2009/0009108 | A1 | 1/2009 | Hongo | |
| 2011/0107128 | A1 * | 5/2011 | Otani et al. | 713/321 |

FOREIGN PATENT DOCUMENTS

JP         2006-020495 A    1/2006

* cited by examiner

*Primary Examiner* — Thomas Lee
*Assistant Examiner* — Danny Chan
(74) *Attorney, Agent, or Firm* — Baker Botts L.L.P.

(57) ABSTRACT

An image forming apparatus is provided, which includes a control unit, one or more motors, and a plurality of power supply management devices each of which includes one or more driving circuits for driving the motors, one or more power supply circuits for supplying electricity to the control unit and an external device, a signal output unit issuing a halting signal to the other power supply management devices in response to detection of an abnormality in the power supply management device, a halting unit halting an operation of the power supply management device in response to receipt of a halting signal from one of the other power supply management devices and detection of the abnormality in the power supply management device, and a restoring unit restoring the halted operation of the power supply management device in response to a predetermined restoring condition being satisfied.

8 Claims, 7 Drawing Sheets

LIST OF OPERATIONS OF POWER SUPPLY MANAGEMENT DEVICE 100

| PATTERN | SITE OF OCCURRENCE OF ABNORMALITY | OPERATION STATE (DC/DC CONVERTERS 121-123) | OPERATION STATE (MOTOR DRIVING CIRCUITS 109-111) | RESET SIGNAL RESET1 | SLEEP SIGNAL SLEEP1 | RESTORING METHOD |
|---|---|---|---|---|---|---|
| 1 | DC/DC CONVERTER 121 or 122 | HALTED | HALTED | VALID | INVALID | POWER-ON RESET |
| 2 | TEMPERATURE MONITORING CIRCUIT | HALTED | HALTED | VALID | INVALID | POWER-ON RESET |
| 3 | MOTOR SYSTEM | NORMALLY OPERATING | HALTED | INVALID | VALID | RESTORING SIGNAL/ POWER-ON RESET |
| 4 | MOTOR REFERENCE CLOCK SIGNAL | NORMALLY OPERATING | HALTED | INVALID | VALID | RESTORING SIGNAL/ POWER-ON RESET |

FIG. 4

LIST OF OPERATIONS OF POWER SUPPLY MANAGEMENT DEVICE 200

| PATTERN | SITE OF OCCURRENCE OF ABNORMALITY | OPERATION STATE (DC/DC CONVERTER 221) | OPERATION STATE (DC/DC CONVERTER 222) | OPERATION STATE (MOTOR DRIVING CIRCUITS 209, 210) | RESET SIGNAL RESET0 | RESET SIGNAL RESET2 | SLEEP SIGNAL SLEEP2 | RESTORING METHOD |
|---|---|---|---|---|---|---|---|---|
| 1 | DC/DC CONVERTER 221 | HALTED | HALTED | HALTED | VALID | VALID | INVALID | POWER-ON RESET |
| 2 | TEMPERATURE MONITORING CIRCUIT | HALTED | HALTED | HALTED | VALID | VALID | INVALID | POWER-ON RESET |
| 3 | MOTOR SYSTEM | NORMALLY OPERATING | NORMALLY OPERATING | HALTED | INVALID | INVALID | VALID | RESTORING SIGNAL/ POWER-ON RESET |
| 4 | MOTOR REFERENCE CLOCK SIGNAL | NORMALLY OPERATING | NORMALLY OPERATING | HALTED | INVALID | INVALID | VALID | RESTORING SIGNAL/ POWER-ON RESET |
| 5 | D/C CONVERTER 222 | NORMALLY OPERATING | HALTED | NORMALLY OPERATING | INVALID | INVALID | INVALID | RESTORING SIGNAL/ POWER-ON RESET |

IMAGE FORMING APPARATUS WITH MOTOR DRIVERS CAPABLE OF DIRECTLY COMMUNICATING POWER ABNORMALITIES TO OTHER DRIVERS

CROSS-REFERENCE TO RELATED APPLICATION

This application claims priority under 35 U.S.C. §119 from Japanese Patent Application No. 2010-284305 filed on Dec. 21, 2010. The entire subject matter of the application is incorporated herein by reference.

BACKGROUND

1. Technical Field

The following description relates to one or more techniques for an image forming apparatus including a plurality of power supply management devices and a motor.

2. Related Art

A printing apparatus has been known, which employs a single combined IC (Integrated Circuit) having a motor driver and a plurality of DC/DC converters. The combined IC is configured to notify a CPU that a specific DC/DC converter is halted by a protection circuit. Further, the combined IC is configured to restore the halted DC/DC converter in response to a signal issued by the CPU, without turning off the combined IC.

SUMMARY

Meanwhile, there are cases where a printing apparatus employs a plurality of combined ICs each of which includes a motor driver and two or more DC/DC converters in order to resolve problems regarding heat generation and/or noises. In such cases, communication between (among) the combined ICs is performed via a CPU. However, when the communication is carried out via the CPU, in a situation where the CPU is supplied with electricity from a failed combined IC, the CPU might not normally operate and the communication might not be performed between (among) the combined ICs. Further, in this case, since it is impossible to inform the other combined IC(s) of the failed combined IC, a secondary failure, which must be an undesired event for a user, might be caused.

Aspects of the present invention are advantageous to provide one or more improved techniques for an image forming apparatus employing a plurality of combined ICs each of which includes a motor driver and two or more DC/DC converters, which techniques make it possible to resolve the aforementioned problems.

According to aspects of the present invention, an image forming apparatus is provided, which includes a control unit configured to perform data processing related to image formation, one or more motors each of which is configured to operate a movable part employed for the image formation, and a plurality of power supply management devices each of which includes one or more driving circuits configured to drive the motors, one or more power supply circuits each of which is configured to supply electricity to one of the control unit and an external device, an abnormality detecting circuit configured to detect an abnormality in the power supply management device, a signal output unit configured to issue a halting signal to a remaining one or more of the plurality power supply management devices in response to the abnormality detecting circuit detecting the abnormality in the power supply management device, a receiving unit configured to receive a halting signal from any of the remaining power supply management devices, a halting unit configured to halt an operation of the power supply management device in response to one of the abnormality detecting circuit detecting the abnormality in the power supply management device and the receiving unit receiving the halting signal from one of the remaining power supply management devices, and a restoring unit configured to restore the halted operation of the power supply management device in response to detecting that a predetermined restoring condition is satisfied.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an image forming apparatus 1 of an embodiment according to aspects of the present invention will be described with reference to the accompanying drawings.

<Configuration of Image Forming Apparatus>

Figure 1:
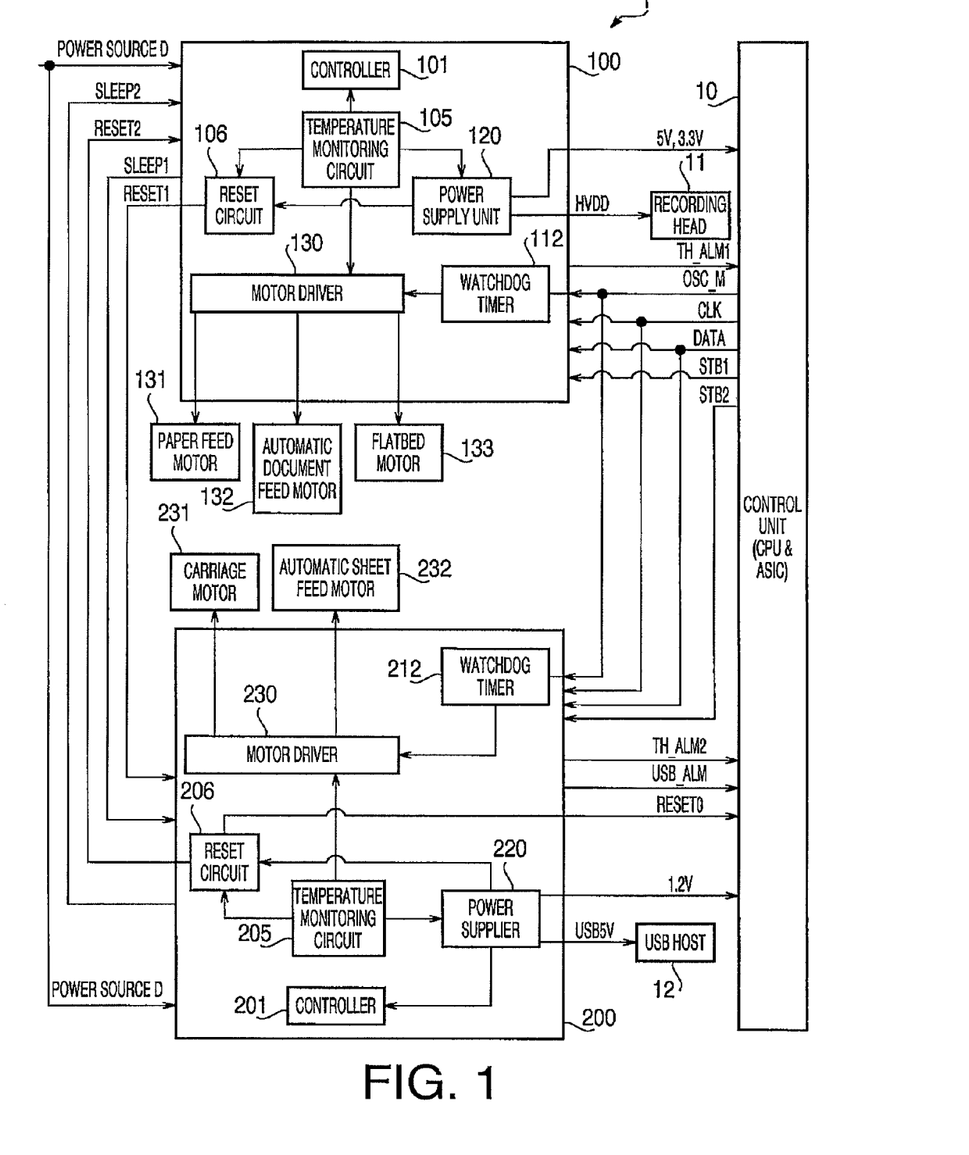
FIG. 1 is a block diagram showing a configuration of a control system of an image forming apparatus in an embodiment according to one or more aspects of the present invention.

As shown in FIG. 1, the image forming apparatus 1 includes a control unit (a CPU and an ASIC) 10, an inkjet-type recording head 11, a USB host 12, power supply management devices 100 and 200, a paper feed motor 131, an automatic document feed motor 132, a flatbed motor 133, a carriage motor 231, and an automatic sheet feed motor 232.

The CPU (Central Processing Circuit) of the control unit 10 is configured to perform information processing related to image formation. The ASIC (Application Specific Integrated Circuit) of the control unit 10 is configured to generate control signals for controlling various motors such as the carriage motor 231 and the recording head 11. The control unit 10 may include the CPU and the ASIC as separate components, or may be a system IC or a system LSI configured integrally with the CPU and the ASIC.

The power supply management devices 100 and 200 are configured as respective separate ICs. The power supply device 100 is a combined IC that includes a motor driver 130 for driving various motors such as the paper feed motor 131 and DC/DC converters 121 to 123 for supplying electricity. The power supply device 200 is a combined IC that includes a motor driver 230 for driving various motors such as the carriage motor 231 and DC/DC converters 221 and 222 for supplying electricity. Namely, the image forming apparatus 1 of the embodiment has two combined ICs.

The paper feed motor 131 is configured to feed a printing sheet in a recording position. The automatic document feed motor 132 is configured to sequentially feed one or more document sheets. The flatbed motor 133 is configured to move a reading unit. The carriage motor 231 is configured to reciprocate a carriage with the recording head 11 mounted thereon, along a predetermined scanning direction. The automatic sheet feed motor 232 is configured to feed a printing sheet from a feed cassette to the recording position. The paper feed motor 131, the carriage motor 231, and the automatic sheet feed motor 232 may simultaneously be driven. The paper feed motor 131, the carriage motor 231, and the automatic sheet feed motor 232 are DC motors. The automatic document feed motor 132 and the flatbed motor 133 are stepping motors.

The recording head 11, mounted on the carriage, is configured to perform recording (printing) while discharging droplets of ink in accordance with an inkjet method. The USB host 12 is configured to be connected with a power supply portion (VBUS) of a USB interface of an intended USB device and supply the intended USB device with an electricity of 5V.

<Power Supply Management Device 100>

Figure 2:
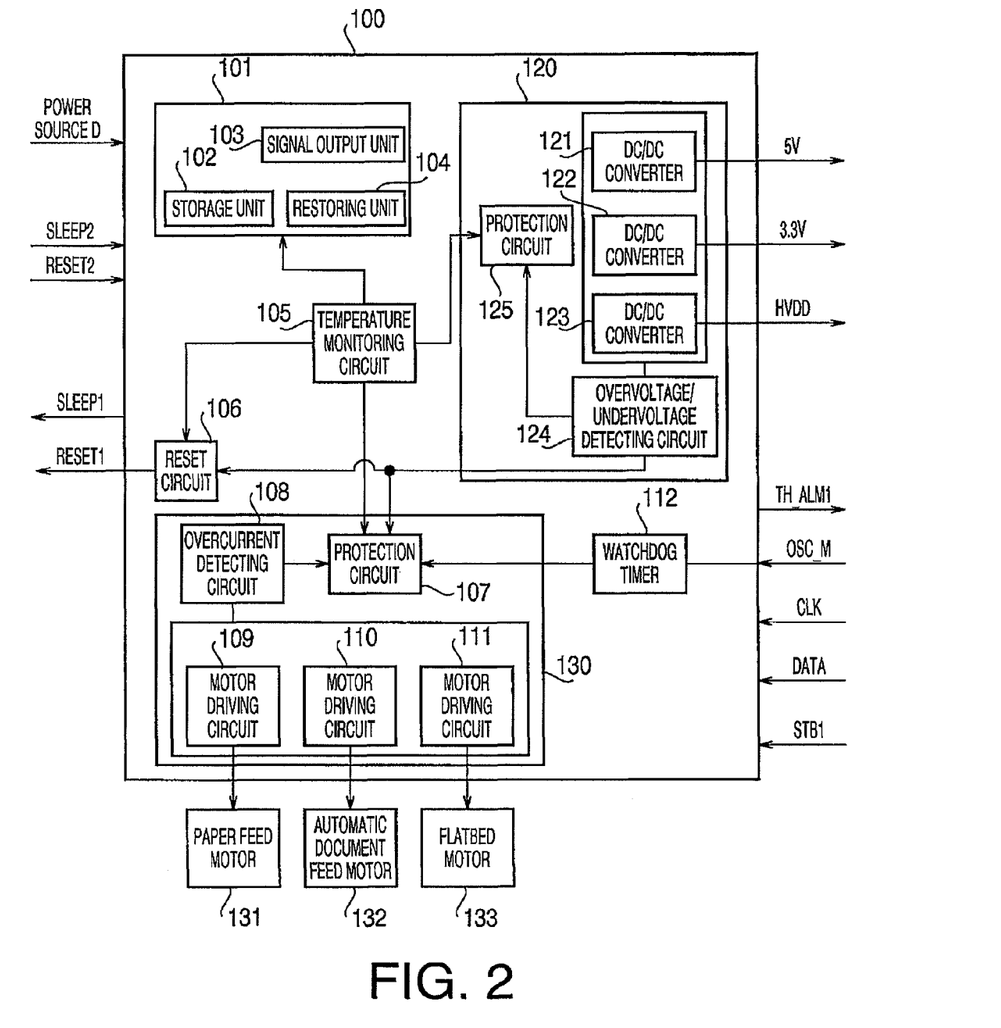
FIG. 2 is a block diagram showing a configuration of a control system of a first one of power supply management devices included in the image forming apparatus in the embodiment according to one or more aspects of the present invention.

FIG. 2 is a detailed block diagram of the power supply management device 100. As depicted in FIG. 2, the power supply management device 100 includes a controller 101, a power supply unit 120, a motor driver 130, a temperature monitoring circuit 105, a reset circuit 106, and a watchdog timer 112.

The motor driver 130 includes motor driving circuits 109, 110, and 111, which are circuits for driving the paper feed motor 131, the automatic document feed motor 132, and the flatbed motor 133, respectively. Each of the motor driving circuits 109, 110, and 111 is configured to drive a motor based on a reference clock signal OSC_M supplied from the control unit (the CPU and the ASIC) 10. Each of the motor driving circuits 110 and 111 includes two H-bridge circuits. Thereby, it is possible to drive the automatic document feed motor 132 and the flatbed motor 133 each of which employs a stepping motor, and thus to achieve sheet feeding control without carrying out feedback control. Further, the motor driving circuit 109 includes an H-bridge circuit.

The motor driver 130 further includes an overcurrent detecting circuit 108 for detecting a current more than a predetermined value flowing in the paper feed motor 131, the automatic document feed motor 132, and the flatbed motor 133. Thereby, it is possible to detect occurrence of an abnormality such as short circuit. Further, it is possible to detect an overload state (such as a paper jam) in which a too high load is placed on a motor. The motor driver 130 further includes a protection circuit 107 configured to halt the motor driving circuits 109 to 111 at the time of occurrence of an abnormality such as overcurrent and an abnormal rise in internal temperature.

The power supply unit 120 includes the DC/DC converters 121 to 123 each of which is configured to convert a power source D of a predetermined voltage, supplied to the power supply management device 100 from a power supply circuit (not shown), into a desired voltage. The DC/DC converter 121 supplies the control unit 10 with electricity of 5 V for an external port. The DC/DC converter 122 supplies the control unit 10 with electricity of 3.3 V for an external port. The DC/DC converter 123 supplies the recording head 11 with electricity HVDD for discharging the ink.

The power supply unit 120 further includes an overvoltage/undervoltage detecting circuit 124 for detecting that output voltages from the DC/DC converters 121 to 123 are over or under respective setting voltages by more than a predetermined ratio of each setting voltage. The power supply unit 120 further includes a protection circuit 125 configured to halt the DC/DC converters 121 to 123 at the time of occurrence of an abnormality such as overvoltage/undervoltage and an abnormal rise in internal temperature.

The temperature monitoring circuit 105 is a circuit for detecting a temperature inside the power supply management device 100. The reset circuit 106 is a circuit configured to issue a reset signal RESET1 to the power supply management device 200 in response to the temperature monitoring circuit 105 or the protection circuit 125 detecting an abnormality.

The watchdog timer 112 is supplied with the motor reference clock signal OSC_M from the control unit 10. The watchdog timer 112 is a circuit configured to cause the protection circuit 107 to halt the motor driving circuits 109 to 111 when detecting an abnormal motor reference clock signal OSC_M.

The controller 101 is supplied with a clock signal CLK, a data signal DATA, and a strobe signal STB1 from the control unit 10. Further, the controller 101 is supplied with a reset signal RESET2 and a sleep signal SLEEP2 from the power supply management device 200. Further, the power source D from the power supply circuit (not shown) is input into the controller 101, the power supply unit 120, and the motor driver 130. The controller 101 is controlled by the control unit 10 via serial communication. Specifically, the serial communication between the controller 101 and the control unit 10 is performed with the three control signals, i.e., the clock signal CLK, the data signal DATA, and the strobe signal STB1. Thereby, for instance, it is possible to perform communication of 16 bit serial data. Further, the controller 101 is configured to communicate with circuits inside the power supply management device 100 such as the power supply unit 120, the overcurrent detecting circuit 108, the reset circuit 106, and the watchdog timer 112, though it is not shown in FIG. 2.

The controller 101 puts the power supply management device 100 into a reset state from a normally operating state in response to receipt of a valid reset signal RESET2 from the power supply management device 200. In the reset state, the operations of the power supply unit 120 and the motor driver 130 are stopped. Then, responsive to execution of a power-on reset operation (i.e., an operation of again turning on the power supply management device 100 by unplugging and plugging a power cable of the image forming apparatus 1), the operations of the power supply unit 120 and the motor driver 130 are restored. Thereby, it is possible to certainly keep the power supply unit 120 and the motor driver 130 in a halt state.

Further, the controller 101 puts the power supply management device 100 from the normally operating state into a sleep state in response to receipt of a valid sleep signal SLEEP2 from the power supply management device 200. In the sleep state, the operation of the motor driver 130 is stopped. Then, responsive to a restoring signal being input into the power supply management device 100, the operation of the motor driver 130 is restored. Thereby, it is possible to quickly and easily restore the motor driver 130 without execution of the power-on reset operation.

The controller 101 includes a storage unit 102, a signal output unit 103, and a restoring unit 104. The signal output unit 103 is configured to issue a sleep signal SLEEP1 to the power supply management device 200 in response to the overcurrent detecting circuit 108 or the watchdog timer 112 detecting an abnormality. Further, the signal output unit 103 is configured to issue an alarm signal TH_ALM1 to the control unit 10 in response to the temperature monitoring circuit 105 detecting an abnormality.

The restoring unit 104 is configured to restore the halted motor driver 130 in response to the restoring signal from the control unit 10 being input into the power supply management device 100 via the serial communication.

The storage unit 102 is a register that stores setting information transmitted by the control unit 10 via the serial communication. As examples of the setting information stored in the storage unit 102, the restoring signal for restoring the operation of the motor driver 130 and a recording command for performing recording (printing) on a printing sheet with the recording head 11 are cited.

<Power Supply Management Device 200>

Figure 3:
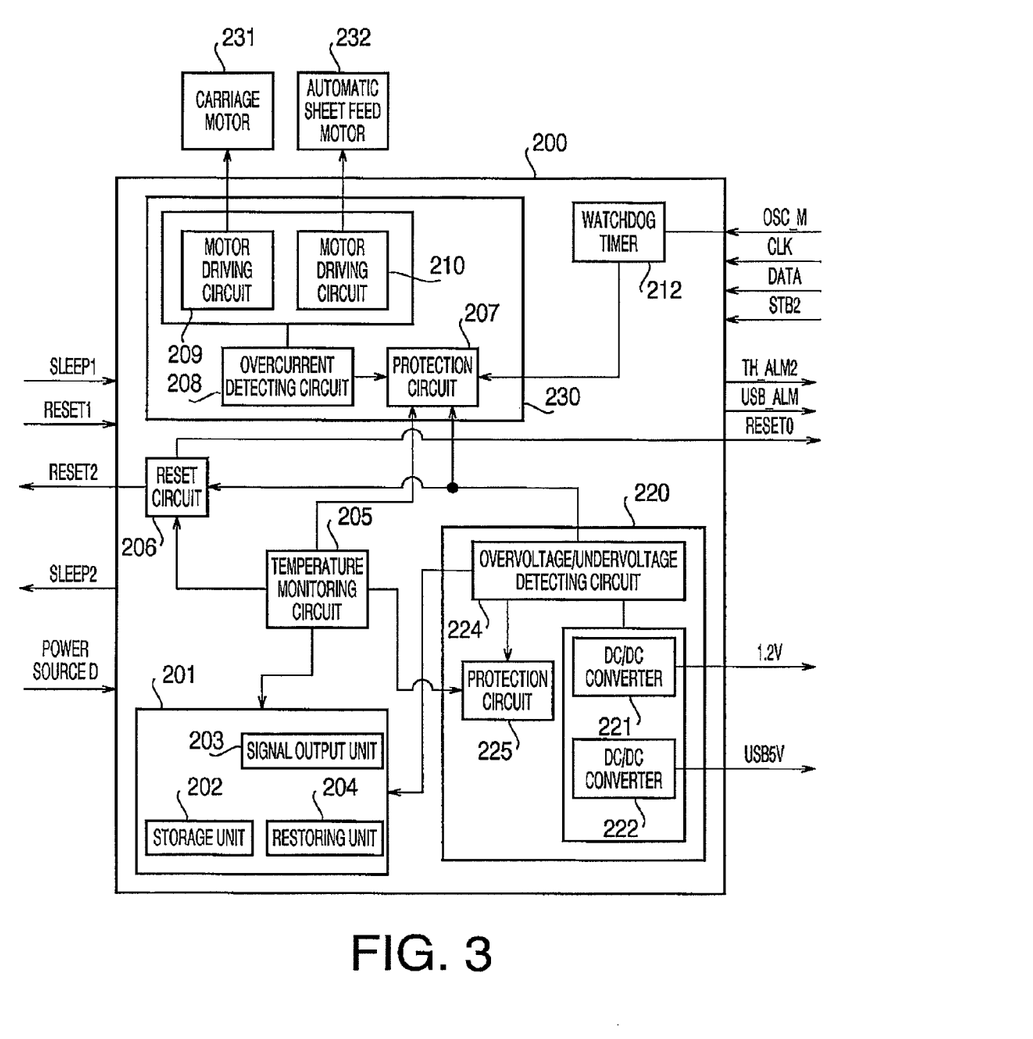
FIG. 3 is a block diagram showing a configuration of a control system of a second one of the power supply management devices included in the image forming apparatus in the embodiment according to one or more aspects of the present invention.

FIG. 3 is a detailed block diagram of the power supply management device 200. As illustrated in FIG. 3, the power supply management device 200 includes the controller 201, the power supply unit 220, the motor driver 230, the temperature monitoring circuit 205, the reset circuit 206, and the watchdog timer 212.

The motor driver 230 includes a motor driving circuit 209 for driving the carriage motor 231 and a motor driving circuit 210 for driving the automatic sheet feed motor 232. Each of the motor driving circuits 209 and 210 includes an H-bridge circuit.

The power supply unit 220 includes the DC/DC converter 221 configured to supply the control unit 10 with electricity of 1.2 V, which is core electricity to be supplied to a core portion of the control unit 10 that performs various calculations. The power supply unit 220 further includes the DC/DC converter 222 configured to supply the USB host 12 with electricity of 5 V.

The signal output unit 203 of the controller 201 issues an alarm signal USB_ALM to the control unit 10. The alarm signal USB_ALM is a signal for informing the control unit 10 about occurrence of an abnormality such as overcurrent/undercurrent in the USB host 12. In addition, the reset circuit 206 issues the reset signal RESET2 to the power supply management device 100, and issues a reset signal RESET0 to the control unit 10. The reset signal RESET0 is a signal for informing the control unit 10 that the power supply management device 200 is to be put into a reset state.

It is noted that each of the other elements included in the power supply management device 200 (see FIG. 3) has the same function as the function of the identically-named element included in the power supply management device 100 (see FIG. 2). Thus, detailed explanations about the other elements of the power supply management device 200 will be omitted.

<Relationship Between Power Supply Management Devices 100 and 200>

The power supply management device 200 (see FIG. 3) is smaller in circuit size than the power supply management device 100 (see FIG. 2). The first reason is, the power supply management device 200 is provided with the motor driving circuit 209 for driving the carriage motor 231. Since the motor driving circuit 209 needs to be driven to reciprocate the carriage for a long time, the motor driving circuit 209 generates a larger amount of heat than the other motor driving circuits. Therefore, when the power supply management device 200, which has the motor driving circuit 209 for driving the carriage motor 231, is smaller in circuit size than the power supply management device 100, it is possible to enhance radiation characteristics of the power supply management device 200. Thereby, it is possible to adopt sufficient measures against the heat generation of the power supply management device 200.

The second reason is, the power supply management device 200 has the DC/DC converter 221 for supplying the core portion of the control unit 10 executing various calculations with the core electricity of 1.2 V. When the control unit 10, in a state not supplied with the core electricity, is supplied with electricity for an I/O port, there might be a failure caused in a port of the control unit 10. Hence, the core electricity is important. Thus, the power supply management device 200, which has the DC/DC converter 221 for supplying the core electricity, is smaller in circuit size than the power supply management device 100. Thereby, it is possible to reduce a risk of failures caused and the amount of heat generated in the power supply management device 200, and to more stably supply the core electricity.

Further, the power supply management device 200 that has the motor driving circuit 210 for driving the automatic sheet feed motor 232 and the power supply management device 100 that has the motor driving circuit 109 for driving the paper feed motor 131 are configured as respective separate ICs. In most cases, the automatic sheet feed motor 232 and the paper fed motor 131 are concurrently driven. Thus, when the power supply management device 200 that has the motor driving circuit 210 and the power supply management device 100 that has the motor driving circuit 109 are configured as respective separate ICs, it is possible to render lower the amount of heat generated in each of the power supply management devices 100 and 200.

Further, in the embodiment, the power supply management device 200 ranks as a primary device, and the power supply management device 100 ranks as a secondary device. Therefore, the power supply management device 200 issues the reset signal RESET0 to the control unit 10. Further, when both of the power supply management devices 100 and 200 are halted, the power supply unit 220 of the power supply management device 200 is desired to be halted after the power supply unit 120 of the power supply management device 100 is halted. This is because the power supply management device 200 has the DC/DC converter 221 for supplying the core electricity of 1.2 V. Thereby, it is possible to avoid a failure that might be caused in the port of the control unit 10 when the control unit 10 is supplied with the electricity for the I/O port in the state where the control unit 10 is not supplied with the core electricity.

<Operations of Image Forming Apparatus>

Operations of the image forming apparatus 1 will be described. The image forming apparatus 1 reciprocates, using the carriage motor 231, the carriage (not shown) with the recording head 11 mounted thereon that performs recording while discharging the ink. Specifically, the image forming apparatus 1 reciprocates the carriage along a guide shaft by rotations of the carriage motor 231 in a first rotational direction and a second rotational direction opposite to the first rotational direction. Further, by driving the paper feed motor 131 and the automatic sheet feed motor 232, the image forming apparatus 1 feeds a printing sheet to the recording position via an automatic sheet feed mechanism (not shown) and a paper feed mechanism (not shown), and performs recording (printing) in the recording position while making the recording head 11 discharge the ink on a surface of the printing sheet.

<Operations in Case of Abnormality (Pattern 1)>

Figure 4:
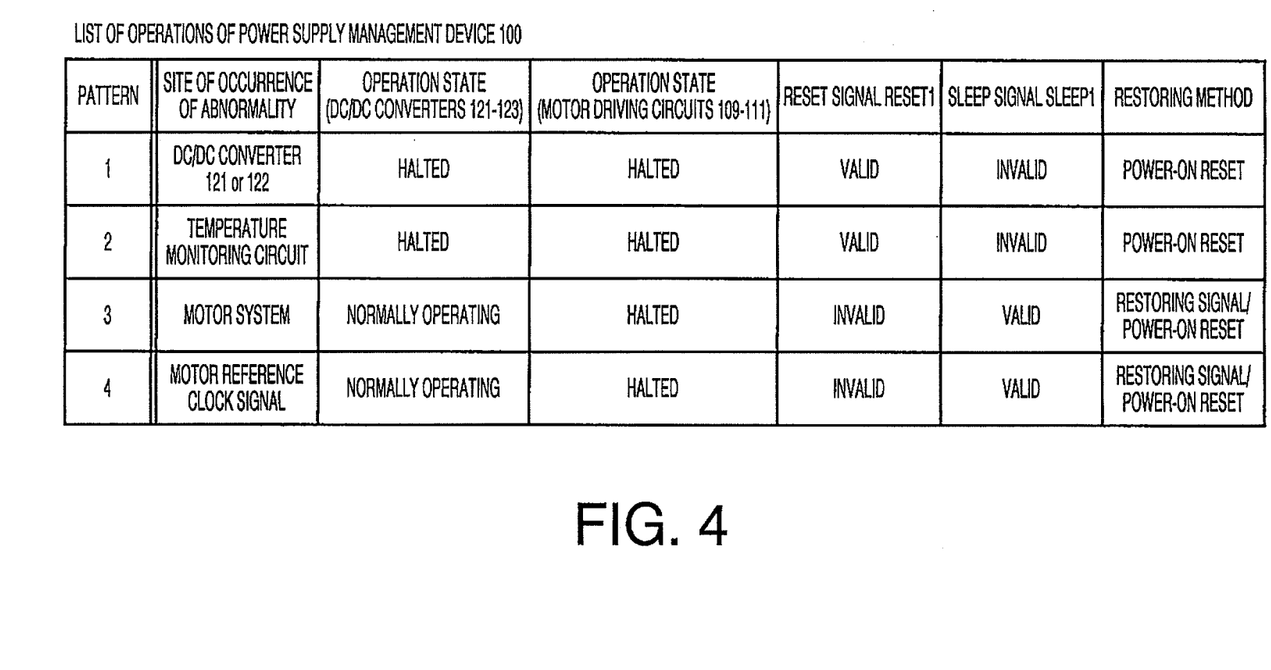
FIG. 4 is a list of operations to be executed by the first power supply management device at the time of occurrence of abnormalities in the embodiment according to one or more aspects of the present invention.
Figure 5:
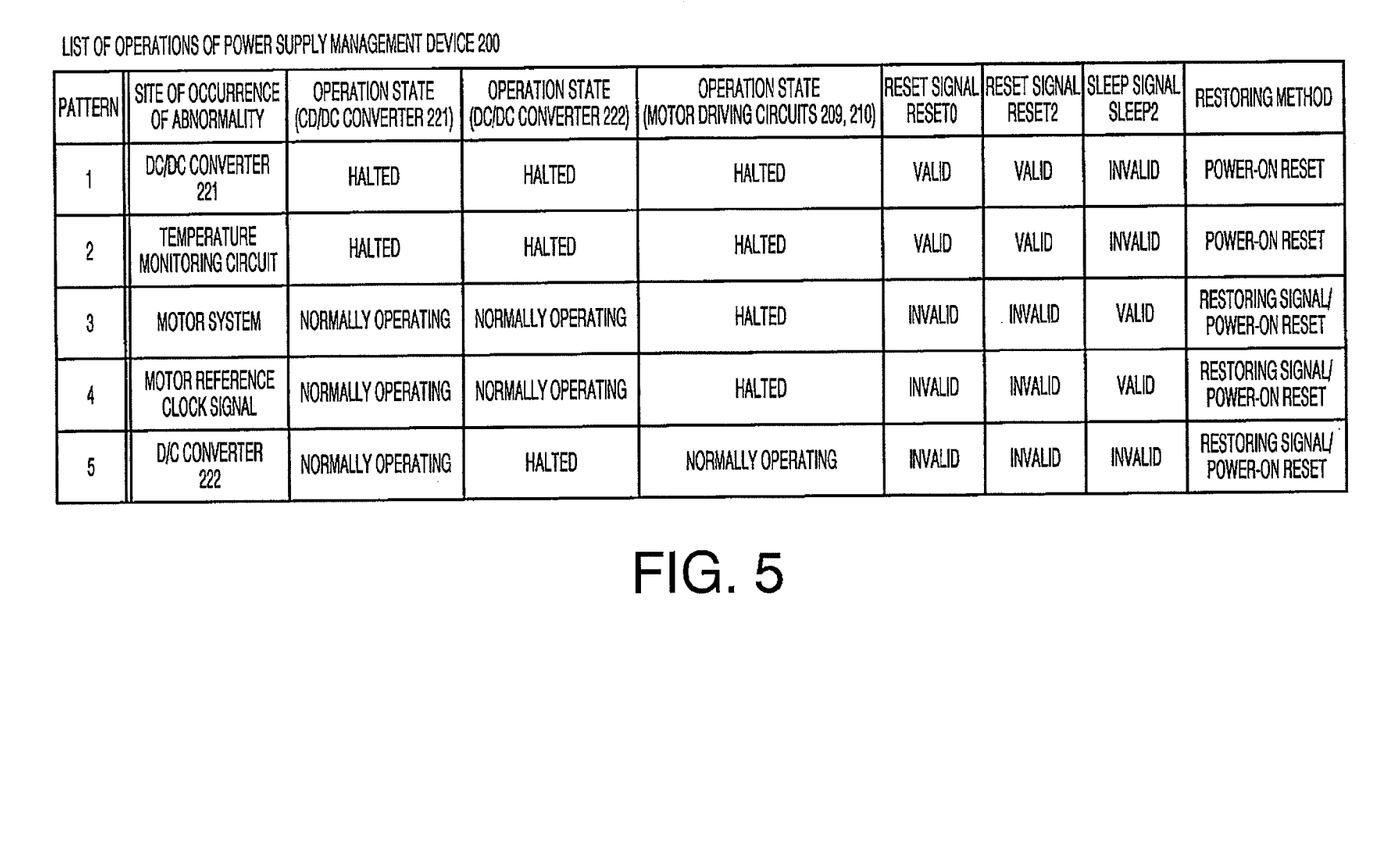
FIG. 5 is a list of operations to be executed by the second power supply management device at the time of occurrence of abnormalities in the embodiment according to one or more aspects of the present invention.

An explanation will be provided below about how the power supply management devices 100 and 200 operate when there is an abnormality caused. Five patterns 1 to 5 will be exemplified with reference to FIGS. 4 and 5. FIG. 4 is a list of operations of the power supply management device 100 at the time of occurrence of abnormalities. FIG. 5 is a list of operations of the power supply management device 200 at the time of occurrence of abnormalities.

Initially, operations of the power supply management device 100 in the pattern 1 will be described (see FIG. 4). The operations in the pattern 1 are operations to be executed when there is an abnormality caused in the DC/DC converter 121 or 122 that supply the control unit 10 with electricity. When the overvoltage/undervoltage detecting circuit 124 detects an abnormality in the DC/DC converter 121 or 122 that supplies the control unit 10 with electricity, the protection circuits 107 and 125, the reset circuit 106, and the controller 101 are informed about the abnormality. The protection circuit 125, which has been informed about the abnormality, halts all the DC/DC converters 121 to 123 included in the power supply management device 100. Further, the protection circuit 107, which has been informed about the abnormality, halts all the motor driving circuits 109 to 111 included in the power supply management device 100. Furthermore, the reset circuit 106, which has been informed about the abnormality, issues a valid reset signal RESET1 to the other power supply management device 200.

Responsive to receipt of the reset signal RESET1, the controller 201 of the power supply management device 200 halts all the DC/DC converters 221 and 222 and all the motor drivers 209 and 210 included in the power supply management device 200.

Additionally, a restoring operation will be described. The restoring unit 104 of the power supply management device 100 restores the operations of the DC/DC converters 121 to 123 and the motor driving circuits 109 to 111 in response to execution of the power-on reset operation. In the same manner, the restoring unit 204 of the power supply management device 200 restores the operations of the DC/DC converters 221 and 222 and the motor driving circuits 209 and 210 in response to execution of the power-on reset operation. As described above, the operations in the pattern 1 shown on the list of FIG. 4 can be achieved.

Additionally, the operations of the power supply management device 200 in the pattern 1 will be described (see FIG. 5). When the overvoltage/undervoltage detecting circuit 224 of the power supply management device 200 detects an abnormality in the DC/DC converter 221 that supplies the control unit 10 with electricity, the protection circuits 207 and 225, the reset circuit 206, and the controller 201 are informed about the abnormality. The protection circuit 225, which has been informed about the abnormality, halts all the DC/DC converters 221 and 222 included in the power supply management device 200. Further, the protection circuit 107, which has been informed about the abnormality, halts all the motor driving circuits 209 and 210 included in the power supply management device 200. Furthermore, the reset circuit 206, which has been informed about the abnormality, issues a valid reset signal RESET2 to the other power supply management device 100, and issues a valid reset signal RESET0 to the control unit 10.

Responsive to receipt of the reset signal RESET2, the controller 101 of the power supply management device 100 halts all the DC/DC converters 121 to 123 and all the motor drivers 109 to 111 included in the power supply management device 100.

Further, responsive to receipt of the reset signal RESET0 from the power supply management device 200, the control unit 10 recognizes that there is a critical abnormality caused in the power supply management device 100 or 200, and executes processes corresponding to the abnormality. As an example of the process to be executed by the control unit 10, cited is a process of transmitting an instruction to halt the motor drivers 130 and 230 to the power supply management devices 100 and 200 via the serial communication. Further cited is a process of indicating on a display panel (not shown) information that there is an abnormality caused in the power supply management device 100 or 200.

Additionally, a restoring operation will be described. The restoring unit 204 of the power supply management device 200 restores the operations of the DC/DC converters 221 and 222 and the motor driving circuits 209 to 210 in response to execution of the power-on reset operation. In the same manner, the restoring unit 104 of the power supply management device 100 restores the operations of the DC/DC converters 121 to 123 and the motor driving circuits 109 and 111 in response to execution of the power-on reset operation. As described above, the operations in the pattern 1 shown on the list of FIG. 5 can be achieved.

The aforementioned operations in the pattern 1 provide the following effects. An abnormality in a DC/DC converter that supplies the control unit 10 with electricity might result in a critical failure. Therefore, by halting the operations of all the DC/DC converters and motor driving circuits, it is possible to certainly prevent a secondary failure. Further, in response to execution of the power-on reset operation for the power supply management devices 100 and 200, the operations of the DC/DC converters and the motor driving circuits are restored. Thereby, it is possible to prevent the operations of the DC/DC converters and the motor driving circuits from being mistakenly restored responsive to a noise signal. Thus, it is possible to certainly keep the power supply management devices 100 and 200 in a halt state.

<Operations in Case of Abnormality (Pattern 2)>

An explanation will be provided below about operations of the power supply management device 100 in the pattern 2 (see FIG. 4). The operations in the pattern 2 are operations to be executed when there is an abnormality regarding heat caused in the power supply management devices 100 and 200.

When the temperature monitoring circuit 105 detects that the temperature of the power supply management device 100 rises over a predetermined temperature, the protection circuits 107 and 125, the reset circuit 106, and the controller 101 are informed about the abnormality regarding the temperature. The protection circuit 125, which has been informed about the abnormality, halts the operations of all the DC/DC converters 121 to 123 included in the power supply management device 100. Further, the protection circuit 107, which has been informed about the abnormality, halts the operations of all the motor driving circuits 109 to 111 included in the power supply management device 100. Moreover, the reset circuit 106, which has been informed about the abnormality, issues a valid rest signal RESET1 to the other power supply management device 200. Furthermore, the signal output unit 103 of the controller 101 issues the alarm signal TH_ALM1 to the control unit 10. Thereby, it is possible to inform the control unit 10 that the power supply management device 100 is put into the reset state.

Responsive to receipt of the reset signal RESET1, the controller 201 of the power supply management device 200 halts the operations of all the DC/DC converters 221 and 222 and motor driving circuits 209 and 210 included in the power supply management device 200.

Additionally, a restoring operation will be described. The restoring unit 104 of the power supply management device 100 restores the operations of the DC/DC converters 121 to 123 and the motor driving circuits 109 to 111 in response to execution of the power-on reset operation. In the same manner, the restoring unit 204 of the power supply management device 200 restores the operations of the DC/DC converters 221 and 222 and the motor driving circuits 209 and 210 in response to execution of the power-on reset operation. As described above, the operations in the pattern 2 shown on the list of FIG. 4 can be achieved.

Additionally, the operations of the power supply management device 200 in the pattern 2 will be described (see FIG. 5). When the temperature monitoring circuit 205 detects that the temperature of the power supply management device 200 rises over a predetermined temperature, the protection circuits 207 and 225, the reset circuit 206, and the controller 201 are informed about the abnormality. The protection circuit 225, which has been informed about the abnormality, halts the operations of all the DC/DC converters 221 and 222 included in the power supply management device 200. Further, the protection circuit 207, which has been informed about the abnormality, halts the operations of all the motor driving circuits 209 and 210 included in the power supply management device 200. Moreover, the reset circuit 206, which has been informed about the abnormality, issues a valid rest signal RESET2 to the other power supply management device 100, and issues a valid reset signal RESET0 to the control unit 10. Furthermore, the signal output unit 203 of the controller 201 issues the alarm signal TH_ALM2 to the control unit 10.

Responsive to receipt of the reset signal RESET2, the controller 101 of the power supply management device 100 halts the operations of all the DC/DC converters 121 to 123 and motor driving circuits 109 to 111 included in the power supply management device 100.

Further, responsive to receipt of the reset signal RESET0 from the power supply management device 200, the control unit 10 recognizes that there is a critical abnormality caused in the power supply management device 100 or 200, and executes processes corresponding to the abnormality Additionally, a restoring operation will be described. The restoring unit 204 of the power supply management device 200 restores the operations of the DC/DC converters 221 and 222 and the motor driving circuits 209 and 210 in response to execution of the power-on reset operation. In the same manner, the restoring unit 104 of the power supply management device 100 restores the operations of the DC/DC converters 121 to 123 and the motor driving circuits 109 and 110 in response to execution of the power-on reset operation. As described above, the operations in the pattern 2 shown on the list of FIG. 5 can be achieved.

The aforementioned operations in the pattern 2 provide the following effects. Owing to the operations in the pattern 2, it is possible to certainly prevent a secondary failure such as a thermal runaway from being caused in the power supply management devices 100 and 200. Further, in response to execution of the power-on reset operation for the power supply management devices 100 and 200, the operations of the DC/DC converters and the motor driving circuits are restored. Thus, it is possible to certainly keep the DC/DC converters and the motor driving circuits in a halt state.

<Operations in Case of Abnormality (Pattern 3)>

An explanation will be provided below about operations of the power supply management device 100 in the pattern 3 (see FIG. 4). The operations in the pattern 3 are operations to be executed when there is an abnormality caused in a motor system.

When the overcurrent detecting circuit 108 of the power supply management device 100 detects overcurrent in at least one of the motor driving circuits 109 to 111, the protection circuit 107 and the controller 101 are informed about the abnormality regarding the overcurrent. The protection circuit 107, which has been informed about the abnormality, halts the operations of all the motor driving circuits 109 to 111 included in the power supply management device 100. It is noted that the DC/DC converters 121 and 123 continue their normal operations. Further, the signal output unit 103 of the controller 101 issues a valid sleep signal SLEEP1 to the other power supply management device 200.

Responsive to receipt of the valid sleep signal SLEEP1, the controller 201 of the power supply management device 200 halts the operations of all the motor driving circuits 209 and 210 included in the power supply management device 200. It is noted that the DC/DC converters 221 and 222 continue their normal operations.

Additionally, a restoring operation will be described. The restoring unit 104 of the power supply management device 100 restores the operations of the motor driving circuits 109 to 111 in response to input of the restoring signal from the control unit 10 into the power supply management device 100 via the serial communication or execution of the power-on reset operation. In the same manner, the restoring unit 204 of the power supply management device 200 restores the operations of the motor driving circuits 209 and 210 in response to input of the restoring signal from the control unit 10 into the power supply management device 200 or execution of the power-on reset operation. As described above, the operations in the pattern 3 shown on the list of FIG. 4 can be achieved.

Operations of the power supply management device 200 in the pattern 3 (see FIG. 5) are the same as those of the power supply management device 100 in the pattern 3 (see FIG. 4). Therefore, a detailed explanation about the operations of the power supply management device 200 in the pattern 3 will be omitted.

The aforementioned operations in the pattern 3 provide the following effects. Owing to the operations in the pattern 3, it is possible to certainly prevent a secondary failure from being caused in driving systems for the motors in response to a runaway of a motor in which the abnormality is caused. Further, since the DC/DC converters are not halted, it is possible to continue operations executable without the motors such as various operations using the control unit 10. Further, in response to the restoring signal being input into the power supply management devices 100 and 200, the operations of the motor driving circuits are restored. Thus, it is possible to quickly and easily restore the operations of the motor driving circuits without execution of the power-on reset operation.

<Operations in Case of Abnormality (Pattern 4)>

An explanation will be provided below about operations of the power supply management device 100 in the pattern 4 (see FIG. 4). The operations in the pattern 4 are operations to be executed when there is an abnormality caused in the motor reference clock signal OSC_M.

When the watchdog timer 112 of the power supply management device 100 detects an abnormality in the motor reference clock signal OSC_M, the protection circuit 107 and the controller 101 are informed about the abnormality. The protection circuit 107, which has been informed about the abnormality, halts the operations of all the motor driving circuits 109 to 111 included in the power supply management device 100. It is noted that the DC/DC converters 121 and 123 continue their normal operations. Further, the signal output unit 103 of the controller 101 issues a valid sleep signal SLEEP1 to the other power supply management device 200.

Responsive to receipt of the valid sleep signal SLEEP1, the controller 201 of the power supply management device 200 halts the operations of all the motor driving circuits 209 and 210 included in the power supply management device 200. It is noted that the DC/DC converters 221 and 222 continues their normal operations.

Additionally, a restoring operation will be described. The restoring unit 104 of the power supply management device 100 restores the operations of the motor driving circuits 109 to 111 in response to input of the restoring signal from the control unit 10 into the power supply management device 100 or execution of the power-on reset operation. In the same manner, the restoring unit 204 of the power supply management device 200 restores the operations of the motor driving circuits 209 and 210 in response to input of the restoring signal from the control unit 10 into the power supply management device 200 or execution of the power-on reset operation. As described above, the operations in the pattern 4 shown on the list of FIG. 4 can be achieved.

Operations of the power supply management device 200 in the pattern 4 (see FIG. 5) are the same as those of the power supply management device 100 in the pattern 4 (see FIG. 4). Therefore, a detailed explanation about the operations of the power supply management device 200 in the pattern 4 will be omitted.

The aforementioned operations in the pattern 4 provide the following effects. Owing to the operations in the pattern 4, it is possible to certainly prevent a secondary failure from being caused in the driving systems for the motors in response to a runaway of a motor in which the abnormality is caused. Further, since the DC/DC converters are not halted, it is possible to continue operations executable without the motors such as various operations using the control unit 10.

<Operations in Case of Abnormality (Pattern 5)>

An explanation will be provided below about operations of the power supply management device 200 in the pattern 5 (see FIG. 5). The operations in the pattern 5 are operations to be executed when there is an abnormality caused in the DC/DC converter 222 that supplies the USB host 12 with electricity.

When the overvoltage/undervoltage detecting circuit 224 of the power supply management device 200 detects an abnormality in the DC/DC converter 222 that supplies the USB host 12 with electricity, the protection circuit 225 and the controller 201 are informed about the abnormality. The protection circuit 225, which has been informed about the abnormality, halts the operation of the DC/DC converter 222. Thus, the operating state of the DC/DC converter 221 is maintained. Further, the signal output unit 203 of the controller 201 issues the alarm signal USB_ALM to the control unit 10. Thereby, it is possible to inform the control unit 10 that the DC/DC converter 222 is halted.

Additionally, a restoring operation will be described. The restoring unit 204 of the power supply management device 200 restores the operation of the DC/DC converter 222 in response to input of the restoring signal from the control unit 10 into the power supply management device 200 via the serial communication or execution of the power-on reset operation. As described above, the operations in the pattern 5 shown on the list of FIG. 5 can be achieved.

The aforementioned operations in the pattern 5 provide the following effects. According to the operations in the pattern 5, only the DC/DC converter 222 in which the abnormality is caused is halted, while the DC/DC converter 221 that supplies the core electricity is not halted. Thus, it is possible to continue operations executable by elements other than the USB host 12 such as various operations using the control unit 10.

<Jam Process>

A jam process to be executed by the control unit 10 will be described with reference to FIG. 6. The jam process is a process to be executed when a printing sheet jams. Further, the jam process is executed under software-based control by the control unit 10.

Figure 6:
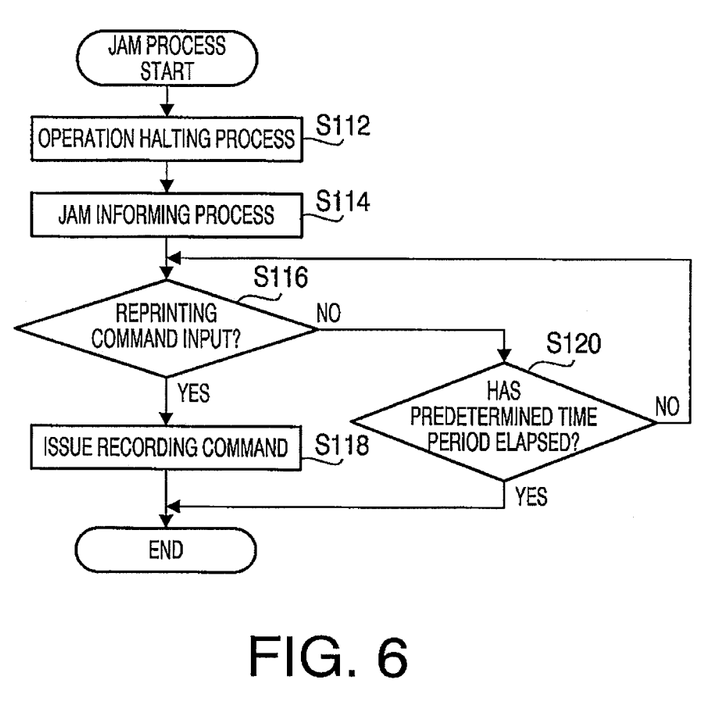
FIG. 6 is a flowchart showing a procedure of a jam process to be executed by a control unit (a CPU and an ASIC) of the image forming apparatus when a printing sheet jams in the embodiment according to one or more aspects of the present invention.

The jam process shown in a flowchart of FIG. 6 is launched in response to detection of a jam of a printing sheet. The jam is detected, for example, by sensing overcurrent in the current value of at least one of the various motors such as the paper feed motor 131 or detecting an abnormality such as a stopped state of one of the motors with an encoder (not shown) for measuring the revolution of the motor.

In S112, the control unit 10 performs an operation halting process, in which transmission of the data signal DATA to the power supply management devices 100 and 200 is interrupted. In S114, the control unit 10 performs a jam informing process. Specifically, the control unit 10 indicates on the display panel (not shown) such a warning as "there is a printing sheet jamming."

In S116, the control unit 10 determines whether a reprinting command is input. The reprinting command is input, for example, when a user presses an OK button (not shown) after removing the jamming printing sheet. When the reprinting command is input (S116: Yes), the control unit 10 goes to S118, in which the control unit resends the recording command containing the restoring signal to the power supply management devices 100 and 200 via the serial communication. Meanwhile, when the reprinting command is not input (S116: No), the control unit 10 goes to S120, in which the control unit determines whether a predetermined time period has elapsed. When determining that the predetermined time period has not elapsed (S120: No), the control unit 10 goes back to S116. Meanwhile, when determining that the predetermined time period has elapsed (S120: Yes), the control unit 10 terminates the jam process.

<USB Abnormality Process>

A USB abnormality process to be executed by the control unit 10 will be described with reference to FIG. 7. The USB abnormality process is performed when an abnormality such as overcurrent is caused in the USB host 12. Further, the USB abnormality process is executed under software-based control by the control unit 10.

Figure 7:
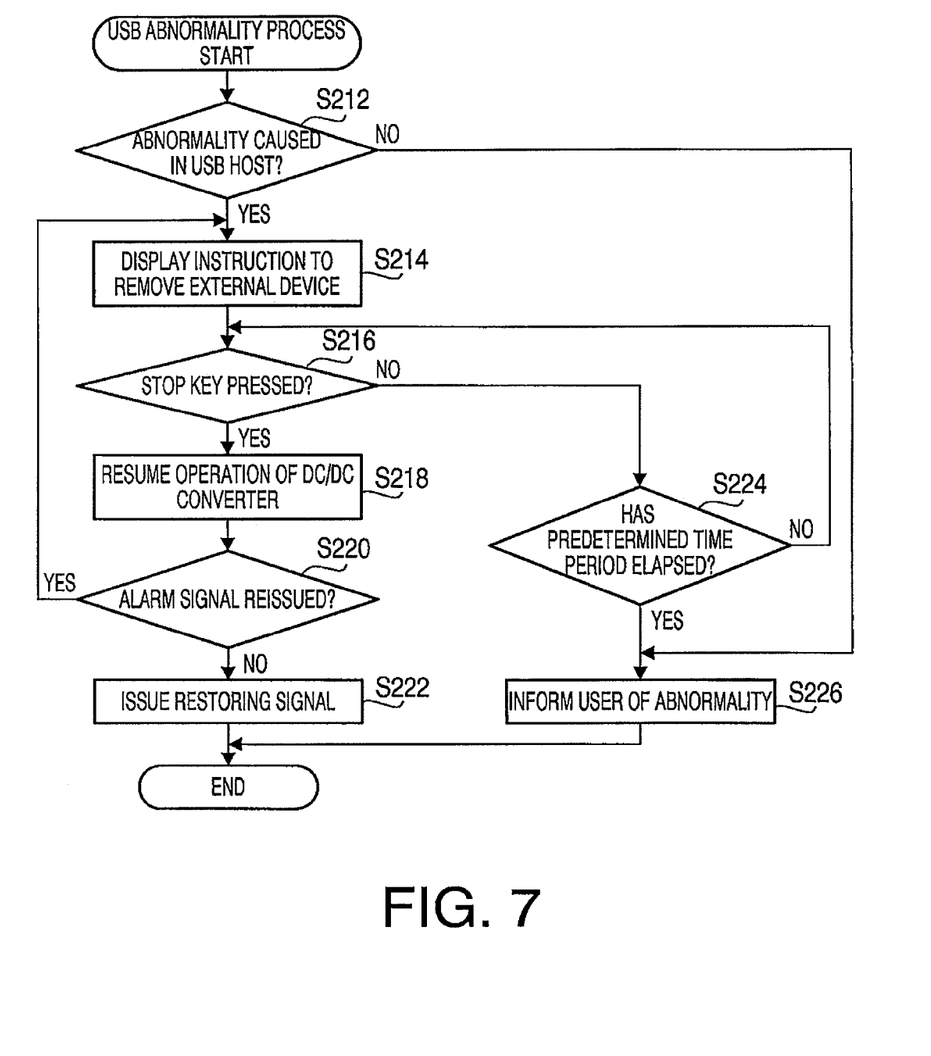
FIG. 7 is a flowchart showing a procedure of a USB abnormality process to be executed by the control unit when there is an abnormality caused in a USB host in the embodiment according to one or more aspects of the present invention.

The USB abnormality process shown in a flowchart of FIG. 7 is launched in response to the power supply management device 200 transmitting the alarm signal USB_ALM to the control unit 10 to inform the control unit 10 that there is an abnormality caused in the USB host 12.

In S212, the control unit 10 determines whether there is an abnormality caused in the USB host 12. The determination is made by identifying the kind of an input signal from the power supply management device 100 or 200. When the input signal is the alarm signal USB_ALM, the control unit 10 determines that an abnormality is caused in the USB host 12. When determining that there is not an abnormality caused in the USB host 12 (S212: No), the control unit 10 advances to S226, in which the control unit 10 performs a process of informing the user of the abnormality caused. For example, when the input signal is the alarm signal TH_ALM1, the control unit 10 indicates on the display panel (not shown) information that there is caused an abnormality regarding the temperature of the power supply management device 100.

Meanwhile, when determining that there is an abnormality caused in the USB host 12 (S212: Yes), the control unit 10 goes to S214, in which the control unit 10 indicates on the display panel (not shown) an instruction to remove an external device connected with the USB host 12. Further, the control unit 10 indicates on the display panel (not shown) an instruction to press a stop key (not shown), after the external device is unconnected from the USB port.

In S216, the control unit 10 determines whether the stop key is pressed. When determining that the stop is not pressed (S216: No), the control unit 10 goes to S224, in which the control unit 10 determines whether a predetermined time period has elapsed. When determining that the predetermined time period has not elapsed (S224: No), the control unit goes back to S216. Meanwhile, when determining that the predetermined time period has elapsed (S224: Yes), the control unit goes back to S226. Further, when determining that the stop is pressed (S216: Yes), the control unit 10 goes to S218. In S218, the control unit 10 resumes the operation of the DC/DC converter 222 via the serial communication. In S220, the control unit 10 monitors whether the power supply management device 200 reissues the alarm signal USB_ALM. When determining that the power supply management device 200 reissues the alarm signal USB_ALM (S220: Yes), the control unit 10 goes back to S214. Meanwhile, when determining that the power supply management device 200 does not reissue the alarm signal USB_ALM (S220: No), the control unit 10 advances to the S222. In S222, the control unit 10 transmits the restoring signal to the power supply management device 200 via the serial communication. Then, the control unit 10 terminates the USB abnormality process.

<Effects>

According to the image forming apparatus 1 of the embodiment, the power supply management devices 100 and 200 are configured as respective separate ICs. Thereby, compared with a configuration that the power supply management devices 100 and 200 are configured as a single integrated IC, the embodiment can provide the following effects. Firstly, it is possible to downsize a package for each IC and to enhance radiation characteristics thereof. Secondly, it is possible to provide higher design flexibility with respect to a layout of outside parts disposed around external pins of each IC. In order to operate the DC/DC converters 121 to 123, 221, and 222, outside parts such as a smoothing capacitor and an inductor need to be disposed around each IC that serves as a power supply management device (i.e., each of the power supply management devices 100 and 200). When the functions of the power supply management devices 100 and 200 are achieved by a single integrated IC (i.e., the power supply management devices 100 and 200 are configured as a single integrated IC), there is a small space around the IC. Hence, the outside parts need to be mounted with long wires on a circuit board, and it results in a higher parasitic inductance and deteriorated regulation characteristics of the DC/DC converters. In this regard, according to the embodiment, the power supply management devices 100 and 200 are configured as respective separate ICs, so as to provide higher design flexibility with respect to the layout of the outside parts. Thereby, it is possible to shorten the length of each wire for mounting the outside parts and to avoid a higher parasitic inductance.

Thirdly, when the DC/DC converters 121 to 123, 221, and 222, which are analog circuits, are disposed on the same IC, it might lead to a noise problem due to interference among the DC/DC converters 121 to 123, 221, and 222. In this regard, according to the embodiment, since the power supply management devices 100 and 200 are configured as respective separate ICs, it is possible to lighten the interference and to reduce the noise level.

Further, according to the embodiment, the power supply management device 100 halts its operation, and issues the reset signal RESET1 to the power supply management device 200 in response to detection of an abnormality in a function of the power supply management device 100 itself. Then, in response to receipt of the reset signal RESET1, the power supply management device 200 can halt its operation. Further, in the same manner, when there is an abnormality caused in the power supply management device 200, the power supply management device 200 halts its operation, and issues the reset signal RESET2 to the power supply management device 100. Then, in response to receipt of the reset signal RESET2, the power supply management device 100 can halt its operation. Thus, transmissions of the reset signals RESET1 and RESET2 are carried out directly between the power supply management devices 100 and 200 without involving an external device such as the control unit 10. Therefore, even though the control unit 10 cannot normally function, it is possible to certainly halt the operations of the power supply management devices 100 and 200. Thereby, it is possible to avoid a secondary failure and to enhance user-friendliness of the image forming apparatus 1.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

<Modifications>

In the aforementioned embodiment, the power supply management devices 100 and 200 are configured as respective separate ICs. However, the functions of the power supply management devices 100 and 200 may be achieved by three or more separate ICs. A larger number of the ICs can enhance the radiation characteristics of the power supply management devices 100 and 200, the design flexibility with respect to the layout of the outside parts disposed around each IC, and the noise reduction effect.

In the aforementioned embodiment, the power supply management devices 100 and 200 include five motors and five motor driving circuits therefor in total. Further, the power supply management devices 100 and 200 include five DC/DC converters in total. However, the power supply management devices 100 and 200 may include six or more motors and six or more motor driving circuits therefor. Further, the power supply management devices 100 and 200 may include six or more DC/DC converters.

Further, when issuing the valid sleep signal SLEEP2 to the power supply management device 100, the controller 201 of the power supply management device 200 may issue a sleep signal SLEEP0 to the control unit 10 as well. Thereby, it is possible to inform the control unit 10 that the power supply management devices 100 and 200 are to be put into the sleep state.

Further, the controller 201 of the power supply management device 200 may issue the valid reset signal RESET0 from the reset circuit 206 to the control unit 10 in response to receipt of the reset signal RESET1 from the power supply management device 100. Thereby, when there is a critical abnormality caused in any of the power supply management devices 100 and 200, it is possible to inform the control unit 10 that there is an abnormality caused.

In the aforementioned embodiment, aspects of the present invention are applied to the inkjet-type image forming apparatus. However, aspects of the present invention may be applied to control circuits of various devices as far as each control circuit includes one or more motor driving circuits and two or more DC/DC converters.

In the aforementioned embodiment, the power supply management devices 100 and 200 are controlled by the control unit 10 via the serial communication. However, when there is no restriction with respect to the number or layout of signal lines, the power supply management devices 100 and 200 may be controlled by the control unit 10 via a plurality of signal lines (via parallel transfer).

In the aforementioned embodiment, aspects of the present invention are applied to the power supply management devices 100 and 200 each of which includes a plurality of DC/DC converters. However, aspects of the present invention may be applied to power supply management devices each of which includes a plurality of power supply circuits such as regulators different from the DC/DC converters exemplified in the aforementioned embodiment.

What is claimed is:

1. An image forming apparatus comprising:
    a control unit configured to perform data processing related to image formation;
    one or more motors each of which is configured to operate a movable part employed for the image formation; and
    a plurality of power supply management devices each of which comprises:
    one or more driving circuits configured to drive the motors;
    one or more power supply circuits each of which is configured to supply electricity to one of the control unit and an external device;
    an abnormality detecting circuit configured to detect an abnormality in the power supply management device;
    a signal output unit configured to issue a halting signal to a remaining one or more of the plurality power supply management devices in response to the abnormality detecting circuit detecting the abnormality in the power supply management device;
    a receiving unit configured to receive a halting signal from any of the remaining power supply management devices;
    a halting unit configured to halt an operation of the power supply management device in response to one of the abnormality detecting circuit detecting the abnormality in the power supply management device and the receiving unit receiving the halting signal from one of the remaining power supply management devices; and
    a restoring unit configured to restore the halted operation of the power supply management device in response to detecting that a predetermined restoring condition is satisfied,
    wherein the plurality of power supply management devices comprises a first power supply management device and a second power supply management device,
    wherein the first power supply management device comprises:
    a first abnormality detecting circuit configured to detect an abnormality in the first power supply management device;
    a first signal output unit configured to issue a halting signal to one or more remaining power supply management devices including the second power supply management device in response to the first abnormality detecting circuit detecting the abnormality in the first power supply management device;
    a first receiving unit configured to receive a halting signal from any of the one or more remaining power supply management devices including the second power supply management device; and
    a first halting unit configured to halt an operation of the first power supply management device in response to one of the first abnormality detecting circuit detecting the abnormality in the first power supply management device and the first receiving unit receiving the halting signal from one of the one or more remaining power supply management devices including the second power supply management device, and
    wherein the second power supply management device comprises:
    a second abnormality detecting circuit configured to detect an abnormality in the second power supply management device;
    a second signal output unit configured to issue a halting signal to one or more remaining power supply management devices including the first power supply management device in response to the second abnormality detecting circuit detecting the abnormality in the second power supply management device;
    a second receiving unit configured to receive a halting signal from any of the one or more remaining power supply management devices including the first power supply management device; and
    a second halting unit configured to halt an operation of the second power supply management device in response to one of the second abnormality detecting circuit detecting the abnormality in the second power supply management device and the second receiving unit receiving the halting signal from one of the one or more remaining power supply management devices including the first power supply management device.

2. The image forming apparatus according to claim 1, wherein
    when the abnormality detecting circuit of a specific power supply management device, of the plurality of power supply management devices, detects an abnormality in one of the power supply circuits of the specific power supply management device which power supply circuit supplies the control unit with electricity,
    the halting unit of the specific power supply management device halts operations of each power supply circuit and the driving circuit of the specific power supply management device, the signal output unit of the specific power supply management device issues the halting signal to each of one or more remaining power supply management devices other than the specific power supply management device of the plurality of power supply management devices, the halting unit of each remaining power supply management device halts operations of each power supply circuit and each driving circuit of the each remaining power supply management device in response to the receiving unit of the each remaining power supply management device receiving the halting signal from the specific power supply management device, and the restoring unit of each of the plurality of power supply management devices restores the halted operations of each power supply circuit and each driving circuit of the power supply management device in response to the power supply management device being turned on again.

3. The image forming apparatus according to claim 1, wherein each of the plurality of power supply management devices comprises a temperature monitoring circuit configured to monitor a temperature of the power supply management device, and wherein when the temperature monitoring circuit of a specific power supply management device, of the plurality of power supply management devices, detects that the temperature of the specific power supply management device rises over a predetermined temperature, the halting unit of the specific power supply management device halts operations of each power supply circuit and each driving circuit of the specific power supply management device, the signal output unit of the specific power supply management device issues the halting signal to each of one or more remaining power supply management devices other than the specific power supply management device of the plurality of power supply management devices, the halting unit of each remaining power supply management device halts operations of each power supply circuit and each driving circuit of the each remaining power supply management device in response to the receiving unit of the each remaining power supply management device receiving the halting signal from the specific power supply management device, and the restoring unit of each of the plurality of power supply management devices restores the halted operations of each power supply circuit and each driving circuit of the power supply management device in response to the power supply management device being turned on again.

4. The image forming apparatus according to claim 1, wherein when the abnormality detecting circuit of a specific power supply management device, of the plurality of power supply management devices, detects an abnormality in the driving circuits of the specific power supply management device, the halting unit of the specific power supply management device halts an operation of each driving circuit of the specific power supply management device, the signal output unit of the specific power supply management device issues the halting signal to each of one or more remaining power supply management devices other than the specific power supply management device of the plurality of power supply management devices, the halting unit of each remaining power supply management device halts an operation of each driving circuit of the each remaining power supply management device in response to the receiving unit of the each remaining power supply management device receiving the halting signal from the specific power supply management device, and the restoring unit of each of the plurality of power supply management devices restores the halted operation of each driving circuit of the power supply management device in response to the power supply management device receiving a restoring signal.

5. The image forming apparatus according to claim 1, wherein each driving circuit of the plurality of power supply management devices is configured to drive one of the motors based on a reference clock, and wherein when the abnormality detecting circuit of a specific power supply management device, of the plurality of power supply management devices, detects an abnormality in the reference clock, the halting unit of the specific power supply management device halts an operation of each driving circuit of the specific power supply management device, the signal output unit of the specific power supply management device issues the halting signal to each of one or more remaining power supply management devices other than the specific power supply management device of the plurality of power supply management devices, the halting unit of each remaining power supply management device halts operation of each driving circuit of the each remaining power supply management device in response to the receiving unit of the each remaining power supply management device receiving the halting signal from the specific power supply management device, and the restoring unit of each of the plurality of power supply management devices restores the halted operation of each driving circuit of the power supply management device in response to the power supply management device receiving a restoring signal.

6. The image forming apparatus according to claim 1, wherein the one or more motors comprise a carriage motor configured to reciprocate a carriage with a printing head mounted thereon along a predetermined scanning direction, and wherein one of the plurality of power supply management devices that comprises a driving circuit for driving the carriage motor is smaller in size than a remaining one or more of the plurality of power supply management devices.

7. The image forming apparatus according to claim 1, wherein the one or more motors comprise an automatic sheet feed motor configured to feed a printing sheet and a paper feed motor configured to convey the printing sheet, wherein the plurality of power supply management devices comprise two separate power supply management devices that comprise a driving circuit for driving the automatic sheet feed motor and a driving circuit for driving the paper feed motor, respectively.

8. The image forming apparatus according to claim 1, wherein one of the plurality of power supply management devices comprises a power supply circuit for supplying electricity to a core portion of the control unit which core portion performs various calculations is smaller in size than a remaining one or more of the plurality of power supply management devices.

* * * * *